United States Patent [19]
Haine

[11] Patent Number: 6,157,363
[45] Date of Patent: *Dec. 5, 2000

[54] METHODS AND APPARATUS FOR DISPLAYING DATA

[75] Inventor: Dominic Philip Haine, Moutain View, Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/613,115

[22] Filed: Mar. 8, 1996

[51] Int. Cl.$^7$ ........................................ G09G 5/00
[52] U.S. Cl. ............................ 345/115; 345/340
[58] Field of Search ........................... 345/115, 116, 345/117, 118, 112, 146, 145, 339, 340, 347, 352; 348/906

[56] References Cited

U.S. PATENT DOCUMENTS

| | | | |
|---|---|---|---|
| 4,716,404 | 12/1987 | Tabata et al. | 345/116 |
| 5,008,853 | 4/1991 | Bly et al. | 345/118 |
| 5,025,396 | 6/1991 | Parks et al. | 345/115 |
| 5,307,086 | 4/1994 | Griffin | 345/116 |
| 5,539,427 | 7/1996 | Bricklin et al. | 345/118 |
| 5,796,402 | 8/1998 | Ellison-Taylor | 345/342 |

OTHER PUBLICATIONS

Mastering Windows 3.1, 1993, pp. 86–87.

*Primary Examiner*—Dennis-Doon Chow
*Attorney, Agent, or Firm*—Beyer Weaver & Thomas, LLP

[57] ABSTRACT

A method for displaying data items of a data record on a computer display screen of a computer. The method includes the step of displaying, in accordance with a condensed display mode, a condensed data set in a condensed data section on the computer display screen. The condensed data set represents a first set of data items of the record that has been preselected to be displayed in the condensed data section in the condensed display mode. The method further includes the step of displaying, upon receiving a predefined user command and in accordance with a detailed display mode, a detailed data set in a detailed data section on the computer display screen. The detailed data section represents a corresponding detailed version of the condensed data section, and the detailed data set represents a second set of data items of the record that has been preselected to be displayed in the detailed data section in the detailed mode. Further, the second set of data items represents a corresponding detailed version of the first set of data items.

26 Claims, 9 Drawing Sheets

METHODS AND APPARATUS FOR DISPLAYING DATA

BACKGROUND OF THE INVENTION

The present invention relates to methods and apparatus for displaying data on a computer display screen. More particularly, the present invention relates to methods and apparatus for displaying data items of a related data set in two display modes to maximize, in the first mode, the number of data items simultaneously displayed and, in the second mode, the details related to the data items of the data set.

With the rising popularity of computers and sophisticated software programs, computer users are challenged with ever-increasing volumes of data. Along with the increased volumes of data, there is an increased need to present and manage data in an organized, user friendly, and easily understood manner.

Computerized databases, which are widely known in the art, represent an attempt to classify, store, process, and display data in an organized fashion. For example, there exists in the art a class of computerized database programs known as personal information managers (PIMs). Broadly speaking, a PIM represents a program for keeping track of information related to people and events that is of interest to its user. In a PIM, related data items pertaining to a person or an event are kept together in a database record, hundreds or more of which may be managed by the PIM. Each record may be thought of as a related data set since all the data items in a given record relate to a particular person or event and are logically organized as one unit. It should be borne in mind that although a PIM is employed herein to simplify the illustration of the prior art as well as the features and advantages of the present invention, the invention disclosed herein is not limited to PIMs and may in fact apply to any software programs that need to display a large number of related data items on a computer display screen.

When a record's data items are displayed on the computer display screen, the challenge has been to display as much of the record's data items as possible without unduly cluttering up the display screen and adversely impacting readability. With reference to FIG. 1, there is illustrated a representative prior art display window (on a computer display screen) for displaying the data items of a PIM's record. In the prior art, each displayed data item typically occupies a distinct data field in the display screen. For example, the name of the person for whom the record is kept occupies a predefined name field; his addresses occupy other predefined address fields; and his phone numbers occupy yet other predefined phone number fields on the computer display screen.

To aid novice users in identifying the significance of each displayed data item, the data fields are usually labeled. With reference to FIG. 1, for example, a person's work address is shown with both the work address data item and a data label for "work." The work address data is further shown in distinct data fields, each of which is associated with a specific data label such as "street," "city," "state," "zip code," "country," and the like.

Although this prior art display method is helpful to novice users, the presence of the data labels, which occupy display screen space, limits the number of data items that can be simultaneously displayed on the computer display screen. It is recognized that after some exposure to the record's data, most users can, even without the aid of data labels, ascertain the significance of some displayed data items merely from their contents and/or their relative position on the display screen. For example, most users are quite capable of recognizing that "Santa Clara" relates to a person's address and not to his age. It is recognized that for these users, some of the data labels may simply be omitted from the display screen without adversely impacting usability. When fewer data labels are displayed, the number of data items that can be simultaneously displayed on the screen is increased without unduly cluttering up the display screen.

On the other hand, there are disadvantages associated with a data display technique that simply omits from view the data labels all the time and does not provide a way for the user to access the data labels associated with the displayed data items. For example, novice users often desire to view the data labels along with the displayed data items to familiarize themselves with the meaning and relative location of the displayed data. As another example, users may want to ensure when editing a data item that they are editing in the correct data field since data fields are often employed, as is known, as keys for sorting and/or other types of data processing tasks. The presence of data labels are helpful in these instances.

Further, it is also recognized that some data items in a record are more critical, i.e., more frequently needed or more important, to the database user than other noncritical data items. If the data items of a record are displayed without regard to their relative importance, there may not be sufficient room in the display screen to display all the critical data items simultaneously. When this happens, the user loses the ability to conveniently view all the critical data items simultaneously on the display screen.

Outside of the database context, it is recognized that as software application programs become more sophisticated, a large number of functions may be offered. These functions may require a large number of user manipulable controls to adequately control all aspects of the program. Also, the results achieved by these functions may be available for display to the user as a set of status data. In this case, the user manipulable controls and the status data may be thought of as data items belonging in a related data set since they facilitate controlling the functions of the program.

In some programs, however, the number of controls and the set of status data may be so large that it is impractical to display all the controls and status data items at once on the display screen. On the other hand, when selected status data items and/or controls are not displayed at all, the user may lose the ability to ascertain the status of aspects of the program and/or the ability to access the non-displayed functions.

In view of the foregoing, what is desired is improved methods and apparatus for displaying data items of a related data set on a computer display screen.

SUMMARY OF THE INVENTION

The invention relates, in one embodiment, to a method for displaying data items of a data record on a computer display screen of a computer. The method includes the step of displaying, in accordance with a condensed display mode, a condensed data set in a condensed data section on the computer display screen. The condensed data set represents a first set of data items of the record that has been preselected to be displayed in the condensed data section in the condensed display mode.

The method further includes the step of displaying, upon receiving a predefined user command and in accordance with a detailed display mode, a detailed data set in a detailed data section on the computer display screen. The detailed data section represents a corresponding detailed version of the condensed data section, and the detailed data set represents a second set of data items of the record that has been preselected to be displayed in the detailed data section in the detailed mode. Further, the second set of data items represents a corresponding detailed version of the first set of data items.

In another embodiment, the invention relates to a method for displaying data items of a related data set in multiple data sections on a computer display screen of a computer. The method includes the step of displaying, in accordance with a condensed display mode, a first data set in a condensed data section on the computer display screen. The first data set represents a first set of data items of the related data set that has been preselected to be displayed in the condensed display mode.

The method further includes the step of displaying, upon receiving a predefined user command and in accordance with a detailed display mode, a detailed data set in a second data section on the computer display screen. The second data set represents a detailed version of the first data set and contains a second set of data items that has been preselected to be displayed in the detailed display mode.

In yet another embodiment, the invention relates to a computer readable medium containing program instructions for displaying data items of a data record on a computer display screen of a computer. The program instructions include instructions for displaying, in accordance with a condensed display mode, a condensed data set in a condensed data section on the computer display screen. The condensed data set represents a first set of data items of the record that has been preselected to be displayed in the condensed data section in the condensed display mode.

There are provided instructions for displaying, upon receiving a predefined user command and in accordance with a detailed display mode, a detailed data set in a detailed data section on the computer display screen. The detailed data section represents a corresponding detailed version of the condensed data section, and the detailed data set represents a second set of data items of the record that has been preselected to be displayed in the detailed data section in the detailed mode. Further, the second set of data items represents a corresponding detailed version of the first set of data items.

These and other advantages of the present invention will become apparent upon reading the following detailed descriptions and studying the various figures of the drawings.

BRIEF DESCRIPTION OF THE DRAWINGS

FIG. 1 shows a typical prior art display screen for displaying data items of a record.

FIG. 5 shows, in accordance with one embodiment, an alternative implementation of the detailed display mode.

DETAILED DESCRIPTION OF THE PREFERRED EMBODIMENTS

Figure 1:
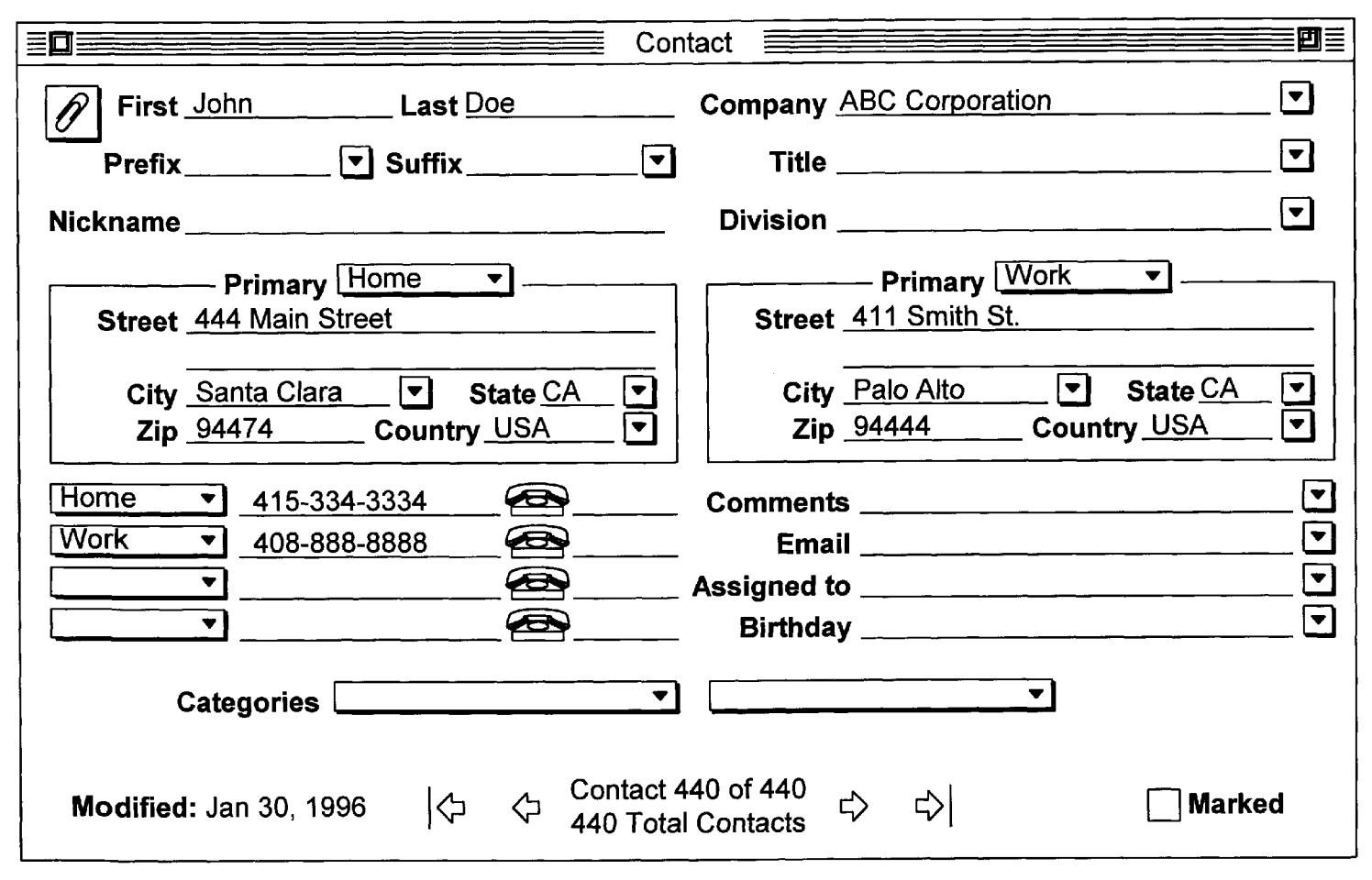
Figure 2:
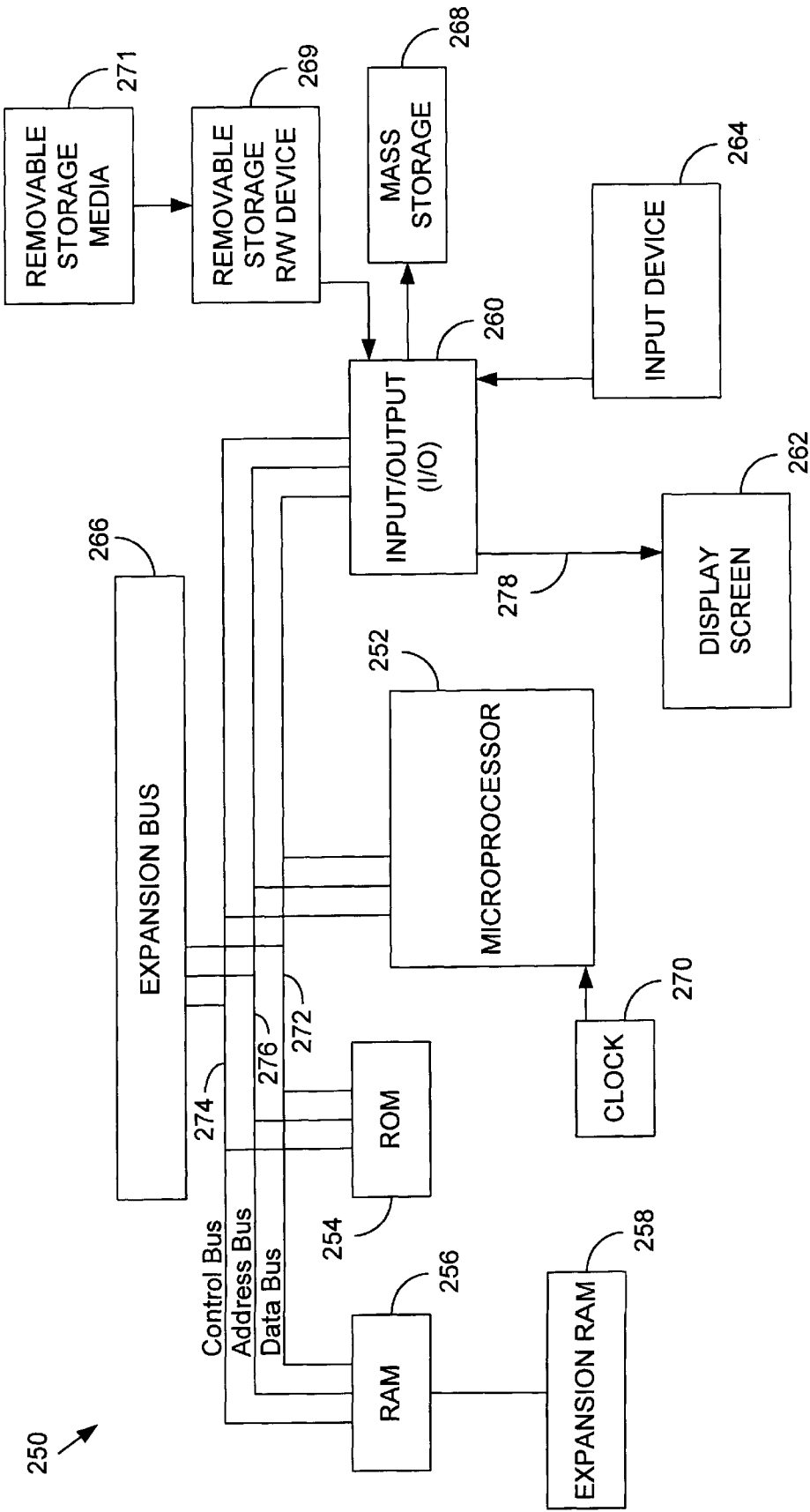
FIG. 2 illustrates a general purpose computer system, representing a suitable computer system for implementing the inventive data display technique.

FIG. 1 shows, for illustration purposes, a typical prior art display screen for displaying data items of a PIM's record. FIG. 2 illustrates a general purpose computer system, representing a suitable computer platform for implementing the inventive data display technique. In FIG. 2, a general purpose computer system 250 includes a central processing unit (CPU) 252, read only memory (ROM) 254, random access memory (RAM) 256, expansion RAM 258, input/output (I/O) circuitry 260, display assembly 262, input device 264, and expansion bus 266. Computer system 250 may also optionally include a mass storage unit 268 such as a disk drive unit or nonvolatile memory such as flash memory and a real-time clock 270.

CPU 252 is preferably a commercially available, single chip microprocessor such as one of the Intel X86 or Motorola 680XX family of chips, and is preferably a reduced instruction set computer (RISC) chip such as the PowerPC microprocessor available from Motorola, Inc. CPU 252 is coupled to ROM 254 by a data bus 272, control bus 274, and address bus 276. ROM 254 contains the basic operating system for the computer system 250. CPU 252 is also connected to RAM 256 by busses 272, 274, and 276 to permit the use of RAM 256 as scratch pad memory. Expansion RAM 258 is optionally coupled to RAM 256 for use by CPU 252. CPU 252 is also coupled to the I/O circuitry 260 by data bus 272, control bus 274, and address bus 276 to permit data transfers with peripheral devices.

I/O circuitry 260 typically includes a number of latches, registers and direct memory access (DMA) controllers. The purpose of I/O circuitry 260 is to provide an interface between CPU 252 and such peripheral devices as display assembly 262, input device 264, and mass storage 268.

Display assembly 262 of computer system 250 is an output device. In the case of certain computers, such as the Apple™ Newton™, display assembly 262 also serves as a part of the input device. When operating as an input device, a position-sensing apparatus disposed on the surface of display assembly 262 works in cooperation with input device 264 to receive data input from the user. Accordingly, it is coupled to I/O circuitry 260 by a data bus 278. When operating as an output device, the display assembly 262 receives data from I/O circuitry 260 via bus 278 and displays that data on a suitable screen. Note that unless display assembly 262 serves an input function, it is not absolutely necessary that data bus 278 be bi-directional.

The screen for display assembly 262 can be a device that uses a cathode-ray tube (CRT), liquid crystal display (LCD), or the like, of the types commercially available from a variety of manufacturers. Input device 264 can be a keyboard, a mouse, a stylus working in cooperation with a position-sensing display, or the like. Alternatively, input device can be an embedded RF digitizer activated by an "active" RF stylus. Therefore, as used herein, the term input device will refer to any mechanism or device for entering data and/or pointing to a particular location on a screen of a computer display. The aforementioned input devices are available from a variety of vendors and are well known in the art.

Some type of mass storage 268 is generally considered desirable. However, mass storage 268 can be eliminated by providing a sufficient amount of RAM 256 and expansion RAM 258 to store user application programs and data. In that case, RAMs 256 and 258 can optionally be provided with a backup battery to prevent the loss of data even when computer system 250 is turned off. However, it is generally desirable to have some type of long term mass storage 268 such as a commercially available hard disk drive, nonvolatile memory such as flash memory, battery backed RAM, PC-data cards, or the like.

A removable storage read/write device 269 may be coupled to I/O circuitry 260 to read from and to write to a removable storage media 271. Removable storage media 271 may represent, for example, a magnetic disk, a magnetic tape, an opto-magnetic disk, an optical disk, or the like. Instructions for implementing the inventive method may be provided, in one embodiment, to a network via such a removable storage media.

In operation, information is inputted into the computer system 250 by typing on a keyboard, manipulating a mouse or trackball, or "writing" on a tablet or on position-sensing screen of display assembly 262. CPU 252 then processes the data under control of an operating system and an application program stored in ROM 254 and/or RAM 256. CPU 252 then typically produces data which is outputted to the display assembly 262 to produce appropriate images on its screen.

Expansion bus 266 is coupled to data bus 272, control bus 274, and address bus 276. Expansion bus 266 provides extra ports to couple devices such as network interface circuits, modems, display switches, microphones, speakers, etc. to CPU 252. Network communication is accomplished through the network interface circuit and an appropriate network.

Still further, the present invention relates to machine readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

For ease of illustration, the remaining of the disclosure is made with reference to a personal information manager (PIM) database implemented on a computer system (such as that discussed in connection with FIG. 2) although, as pointed out earlier, it should be understood that the present invention applies to the display of data items of any related data set, whether or not implemented in a database.

Figure 3:
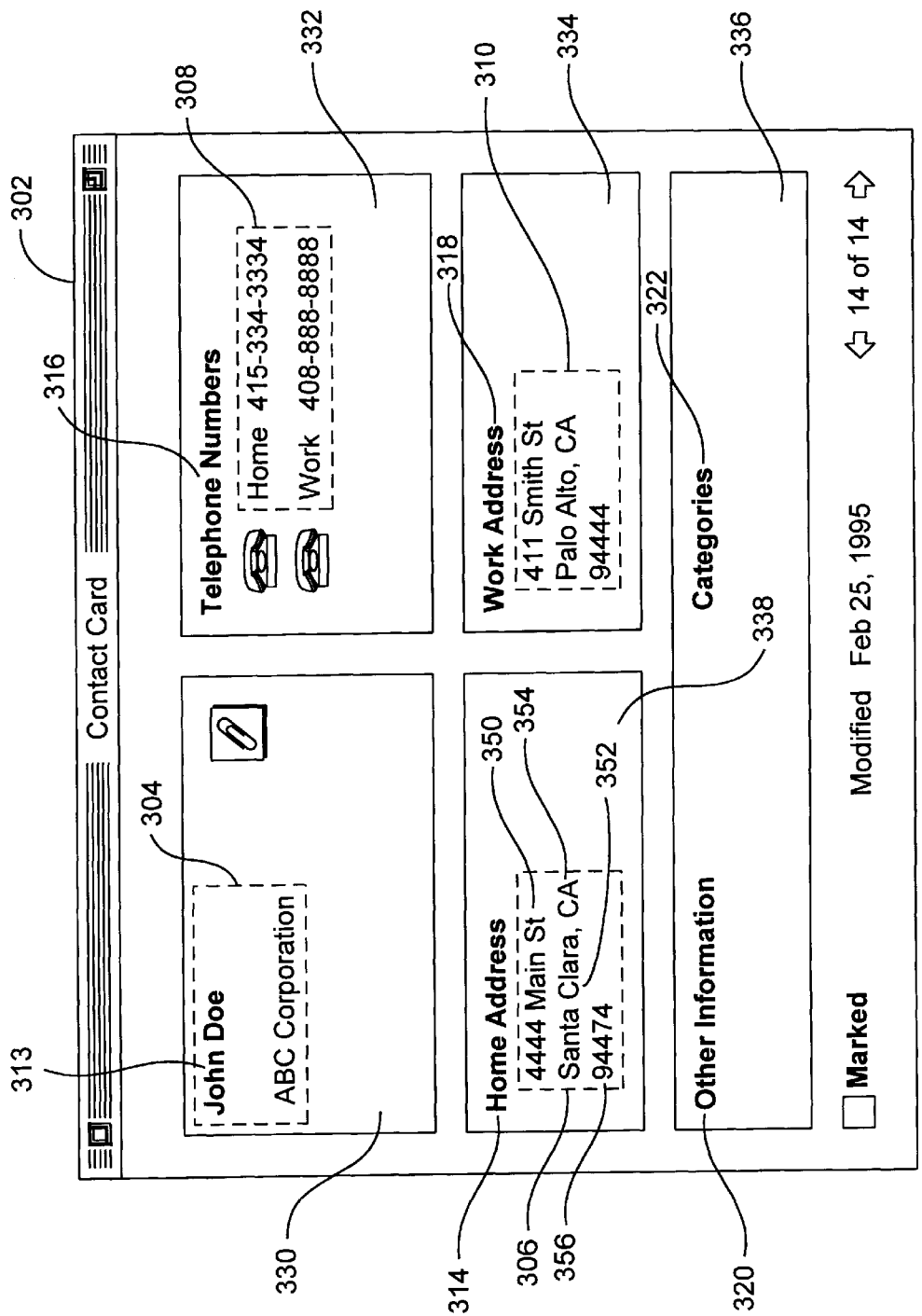
FIG. 3 illustrates, in accordance with one aspect of the present invention, a window for displaying data items of a record in the condensed display mode.

Referring now to FIG. 3, there is shown a window 302 for displaying a PIM record in the condensed display mode. The condensed display mode represents one of the two computer-implemented data display modes for displaying data items of a record and refers to the display mode wherein only the data items that are preselected to be displayed in this mode are displayed on the display screen. Other data items of the record that are not so preselected are omitted from the display screen in this condensed display mode to save space and reduce clutter. Further, only the data labels that are preselected to be displayed in this condensed display mode are displayed. Other data labels not so preselected are also omitted from the display screen in this condensed mode to save space and reduce clutter. The omission of some data items and data labels advantageously allows more of the record's condensed data items, e.g., the more frequently needed or more basic to a record, to be displayed at once in the condensed display mode for the user's viewing convenience.

By way of example, there are shown in display window 302 of FIG. 3 a plurality of condensed data sets 306, 308, and 318, representing the sets of data items that have been preselected for display in the condensed display mode. The above-mentioned plurality of condensed data sets are shown displayed along with their respective condensed label sets 314, 316, and 310. A condensed label set represents a set of data labels that is preselected to be displayed in the condensed display mode to identify its associated condensed data set.

For the convenience of the user, each condensed data set and its associated condensed label set, i.e., the condensed data, are preferably displayed in one of respective condensed data sections 330, 332, 334, 336, and 338. As the term is used herein, the condensed data refers to the plurality of condensed data sets, along with their associated condensed label sets. Within condensed data section 338, for example, condensed label set 314 ("Home Address") identifies condensed data set 306 as the set of data items representing the home address of the database record for John Doe ("the Doe record") that have been preselected for display in the condensed display mode. Analogously, in condensed data section 334, condensed label set 318 ("Work Address") identifies its associated condensed data set 310 as the set of data items representing the work address of the Doe record that have been preselected for display in the condensed display mode.

In accordance with one aspect of the present invention, it is not necessary that each condensed data set has an associated label set in the condensed display mode. For example, condensed data set 304, which includes two data items, i.e., the name of the person for whom the record is kept ("John Doe") and his workplace ("ABC Corporation"), requires no associated label set. This is because most users can likely ascertain the meaning of these two data items from their contents and from the PIM context even without the aid of data labels. As mentioned above, the elimination of certain data labels in the condensed display mode advantageously saves space to allow more of the critical data items of the record to be simultaneously displayed and to reduce screen cluttering.

A condensed data set, such as condensed data set 306 (Home Address), may include multiple data items. By way of example, data item 350 represents the street address of Doe's home, data items 352 and 354 represent respectively the city and state in which Doe's home is located, and data item 356 represents the zip code of Doe's home address. There may exist other data items related to Doe's home address which, for various reasons (e.g., because they are not critical or not frequently needed), are preselected to be omitted from view in the condensed display mode. Such a data item may represent, for example, the driving instruction to Doe's home. The omission of these noncritical data items advantageously reduces the number of data items that must be displayed at once in the condensed display mode.

With regard to the individual data items that are preselected to be displayed in the condensed display mode, some of these data items may also be displayed without their individual associated specific data labels. For example, although the entire condensed data set 306 is displayed with an associated condensed label set (i.e., condensed label set 314 "Home Address"), to identify the significance of the entire condensed data set, none of individual data items 350, 352, 354, and 356 in that set are displayed with their individual associated specific data labels in the condensed display mode. The omission of a data label is appropriate when, for example, the user can readily ascertain the meaning of the displayed data item without having to resort to the data label. On the other hand, a condensed label set may include more than one label to more clearly identify the meaning of the data items displayed in the condensed display mode. For example, the condensed label set in condensed display section 332 comprises three labels: "Telephone Numbers," "Home," and "Work." In this case, the inclusion of the specific data labels is appropriate since the user may have a difficult time distinguishing Doe's home phone number from his work number in the absence of data labels.

In one embodiment, if a given record does not have a specific data item in its condensed data set, the invention may collapse the fields together to save space in the condensed display panel. By way of example, if no street address (i.e., "4444 Main Street") had been kept for John Doe in the Doe record of FIG. 3, the invention may move the remaining data items up (i.e., the city, state, and the zip code data items "Santa Clara, Calif. 94474" upward to save space in condensed data section 338.

In one embodiment, the data items in the condensed display mode are formatted to maximize usability and ease of viewing. For example, if a given record is employed to track a person, that person's name is preferably bolded in the condensed data section. If the name is not available but the company's name is, the company's name is then bolded in the condensed display panel to facilitate ease of viewing. In one embodiment, the data items related to a person's mailing address may be formatted for display in a condensed data section to reflect the address formatting convention of the given country or organization. This formatting is preferably performed automatically responsive to the country information in the mailing address data.

By not displaying some of the record's data items and data labels in the condensed display mode, the inventive display technique advantageously maximizes, in the condensed display mode, the number of data items that can be properly displayed at once. There are times, however, when the user may wish to view the data items in detail, i.e., without omitting any data item and along with their individual associated data labels or any other user manipulable controls that may be furnished with the data items. This detailed display mode of displaying the record's data may be helpful to, for example, novice users who, through insufficient exposure to the data and the data presentation format, are not yet able to ascertain the meaning of the displayed data items in the absence of the individual associated data labels. Additionally, the detailed display mode may be useful to users while editing the data items because it allows the user to visually confirm that corrections are made in the appropriate data fields. If data items have other associated controls (e.g., the related data set is a set of user manipulable front-end controls of a software package), the presentation of these controls along with the data items furnishes the user with a greater number of options for working with the data items.

In accordance with one aspect of the present invention, there is provided a detailed display mode for displaying the record's data items, including those not preselected to be displayed in the condensed display mode, as well as data labels that more specifically identify the meaning of the individual displayed data items. Further and as will be shown herein, the present invention advantageously allows the user to toggle between the condensed display mode and the detailed display mode to alternatively view the same set of data items, either in its condensed format or in its detailed format in a highly intuitive manner.

Figure 4:
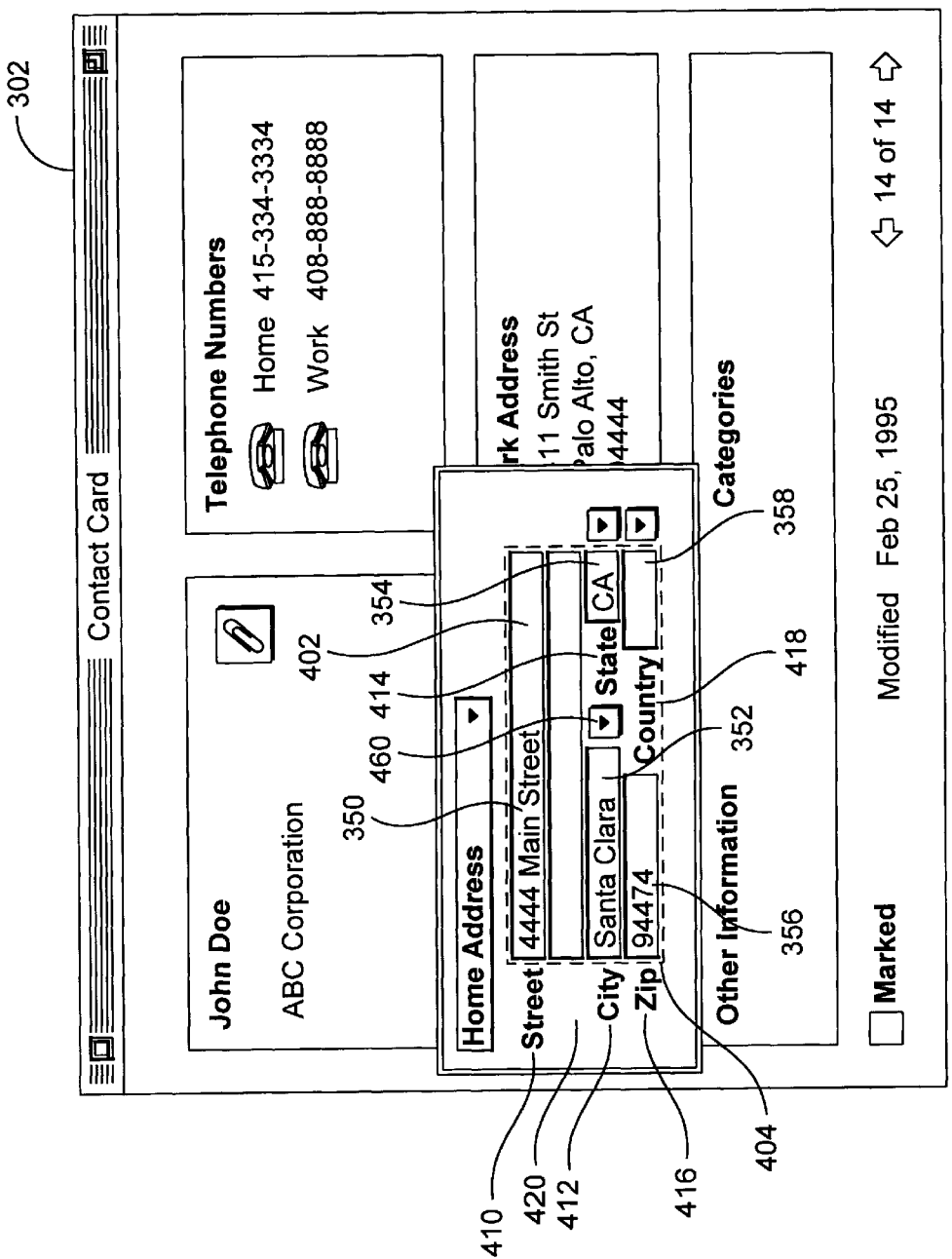
FIG. 4 illustrates, in accordance with another aspect of the present invention, the detailed display mode for displaying some of the data items of FIG. 3 in detail.

Referring now to FIG. 4, there is illustrated window 302 of FIG. 3 in which the data items associated with condensed data section 338 (Home Address) are now displayed in the detailed display mode. The display mode of a data section may change from the condensed display mode to the detailed display mode when, for example, a predefined user command is received. The predefined user command may represent, for example, a predefined keystroke sequence, a mouse click anywhere within condensed data section 338, a predefined command to edit a data item within condensed data set 306, or any other conventional user interface action.

In accordance with one embodiment of the present invention, the detailed display mode advantageously applies data section-by-data section. In other words, it is possible to designate a given condensed data section to display its associated data items in the detailed display mode without requiring other condensed data sections, which may be displaying their associated data items in the condensed display mode, to do likewise. In this manner, the present invention allows the user to effect display mode changes only to the portion of the record's data that is of interest to the user.

A data section that contains the record data items displayed in the detailed display mode is referred to herein as a detailed data section. For example, detailed data section 420 contains both the data items that are formerly displayed in condensed data section 338 of FIG. 3, i.e., the condensed data set associated with condensed data section 338, as well as the data items not preselected for display in the condensed display mode. Together, these data items displayed in a detailed display section are called a detailed data set. Detailed data section 420 preferably contains data labels that more specifically identify the data items displayed in the detailed display mode. If there are controls or other devices/details associated with the data items of the detailed display section, they are preferably displayed as well in this detailed display mode. The data labels (and controls) displayed in a detailed data section are referred to herein as a detailed label set.

Preferably, detailed data section 420 is visually distinct in design from the condensed data sections 330, 332, 334, 336, and 338 in order to signify to the user that data section 420 is a detailed data section, i.e., containing data items displayed in the detailed display mode. For example, the detailed data section may appear either visually floating over or recessed within the window that displays the data sections. In one embodiment, the detailed data section is preferably displayed in the location of and in lieu of the condensed data section it replaces, and all other condensed data sections stay unchanged with respect to their relative locations in the display window to emphasize display continuity.

In the detailed display mode, the data items are preferably displayed within their associated predefined data fields. For example, data item 350 "4444 Main St." is positioned within the two lines that make up predefined data field 402. Likewise, data item 356 "94474" is positioned within the predefined data field 404 and so on. In one embodiment, the fields displayed in the detailed display mode are preferably arranged to simplify editing. This is in keeping with the overall design of the inventive display technique, which maximizes data presentation efficiency in the condensed display mode and emphasizes details and/or control editing options in the detailed display mode.

When displayed in the detailed display mode of FIG. 4, the data items are preferably shown along with their individual associated data labels, if provided, to more clearly explain the meaning of the displayed data items. For example, data item 350 "4444 Main St." is identified as the street name of Doe's home by its associated data label 410 "Street." Likewise, data labels 412, 414, and 416 serve to identify the meaning of their respective data items 352, 354, and 356. Note that none of data labels 410–418 of FIG. 4 are displayed in the condensed display mode of FIG. 3 to save space. Also note that in this example, data item 358, which is identified by data label 418 "Country," is a null item, i.e., no country data is kept for Doe's home address. Nevertheless, a blank data field is displayed in the detailed data section to simplify editing and to signal to the user that there is room for storing this data item, if this data item becomes available. Preferably, no such blank data field is shown in the condensed data section of FIG. 3 to save space.

When the data items are displayed in the detailed display mode, they can, in one embodiment, be edited by the user. To move between fields, the user may employ any conventional user interface action, including employing a mouse click or a predefined keystroke sequence, e.g., cycling through the fields using a tab key. Since the data items are shown along with their associated data labels in the detailed display mode, the user can advantageously verify for himself that corrections are made in the appropriate data field. For example, when data item 350 is edited, the user can readily determine, from the proximity of data label 410, that the edit affects the street address data. Visual cues, such as highlighting the data item being edited (e.g., data field 402 of FIG. 4) also serve to improve the user's ability to ascertain the accuracy of the editing task. In this manner, the dual display modes (i.e., condensed and detailed) advantageously increase the number of critical data items that can be displayed at once in the display window while permitting the user, upon entering the detailed display mode, to view the portion of the record's data of interest in more detail, along with all their data labels, and to edit them with greater ease. As mentioned earlier, the user may view a portion of the record data of interest by performing a predefined user interface action to cause a detailed data set and a detailed label set associated with a data section to be displayed.

In addition to displaying additional data labels, controls, and data items, the detailed display mode may, in one embodiment, show additional editing tools to assist the user in editing the displayed data items. For example, FIG. 4 shows an indicator 460, representing an icon for displaying a picklist of cities. In the detailed display mode, the user may manipulate indicator 460 to cause a list of cities to appear. From this list, a city may be selected to represent Doe's home city. As another example, specialized controls (e.g., sliding control) may be provided to assist in the editing of certain data items (e.g., a person's age). As a further example, blank fields may be provided to enable the user to add data while editing.

Figure 5:
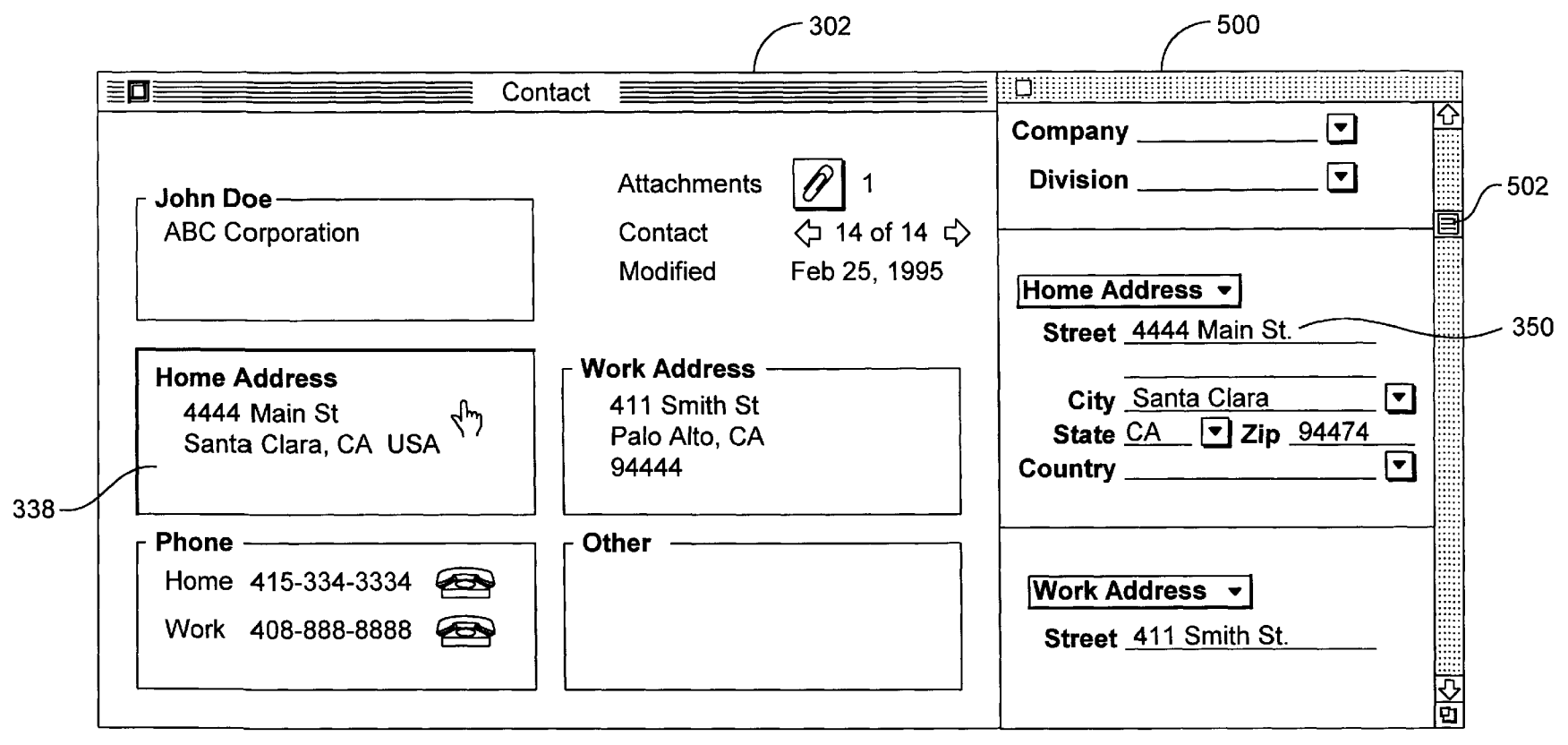

FIG. 5 shows an alternative embodiment wherein the data items, when displayed in the detailed display mode, are displayed in a non-overlapping detailed window (instead of in a detailed data section within the same window that is used to display the condensed data sections). When so displayed, the user may view the data items simultaneously both in the condensed display mode and in the detailed display mode. This non-overlapping detailed window is shown in FIG. 5 as detailed window 500. Although detailed window 500 is positioned abutting window 302 in FIG. 5, it is contemplated that it may be, in one embodiment, positioned apart from window 302 and may in fact be positioned at any convenient location on the computer display screen.

In the example of FIG. 5, detailed window 500 is implemented as a scrolling window. By manipulating a scroll button 502, the user may scroll through the detailed data sections to view the record's data in detail. Alternatively, the user may directly designate a condensed data section for detailed display via any appropriate user interface action, e.g., clicking within condensed data section 338. Upon being so designated, the corresponding detailed data section is displayed in detailed window 500. In one embodiment, the condensed data section corresponding to the detailed section in focus (i.e., the detailed section being viewed or edited in the detailed window) is visually marked, e.g., highlighted, to help the user ascertain the condensed data section whose associated data items are being rendered in the detailed display mode.

It is contemplated that when a condensed data section has associated with it a relative large number of data items preselected to be displayed in the condensed mode, i.e., the condensed data set associated with condensed data section contains a large number of data items, the condensed data section may grow to accommodate these data items. Further, it is contemplated that the window itself may grow to accommodate the larger condensed data section. By way of example, if condensed data section 332 of FIG. 3 contains six phone numbers, i.e., all six are preselected to be displayed in the condensed display mode in condensed data section 332, the invention may grow condensed data section 332 (and perhaps also window 302) to accommodate these additional phone numbers. Analogously, the expanded data section may grow in order to accomodate the entry of additional data items when the number of data items entered exceeds the size of an existing expanded data section.

Figure 6:
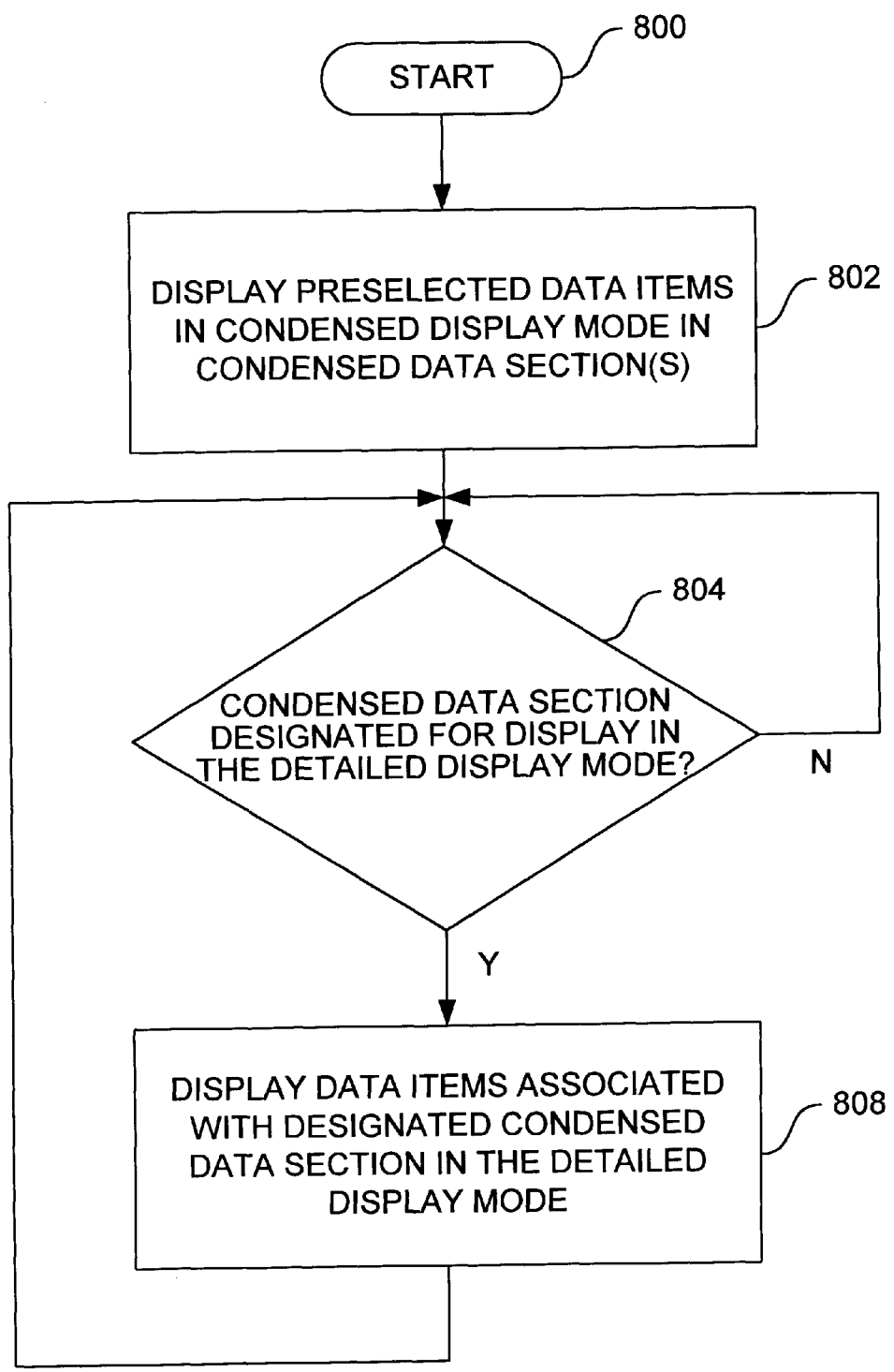
FIG. 6 is a flowchart illustrating, in one embodiment, the inventive data display technique.

The inventive technique for displaying a record's data in the dual condensed/detailed display modes will now be explained in detail in the following flowcharts. FIG. 6 is a flowchart illustrating the data display method in accordance with one embodiment of the present invention. FIG. 6 starts at step 800. In step 802, preselected data items of the database record, along with preselected data labels, (i.e., the condensed data sets and associated condensed label sets) are displayed in the condensed display mode. In one embodiment, these preselected data items and labels are displayed in multiple condensed data sections of a display window. With reference to FIG. 3, the condensed data sections are shown as condensed data sections 330, 332, 334, 336, and 338. As mentioned earlier, many of the data labels associated with the displayed data items may be preselected to be omitted from view in the condensed display mode. Further, many of the record's data items (e.g., those deemed noncritical or infrequently needed by the user) may also be preselected to be omitted from view when the record is displayed in the condensed display mode.

In step 804, the method ascertains whether the user has designated a condensed data section for displaying in the detailed display mode. In the preferred embodiment, the user may simply place the screen cursor anywhere within the condensed data section, e.g., within condensed data section 338 of FIG. 3, and perform a mouse click in order to indicate his desire to display the data items associated with that condensed data section in the detailed display mode. Alternatively, the user may choose to employ a scrolling apparatus such as scroll button 502 of FIG. 5 to scroll through a detailed display window in order to view the data items in detail. Still in another embodiment, the user may so designate using any of the conventional user interface actions such as a predefined keystroke sequence, and others.

If no condensed data section is designated to display its associated data items in the detailed display mode, the method simply waits until a condensed data section is designated. On the other hand, if any condensed data section is designated for detailed display, the method proceeds to step 808 wherein the data items associated with the designated condensed data section are displayed in the detailed display mode. In one embodiment, once the data items are displayed in the detailed display mode, e.g., in detailed data section 420 of FIG. 4, the data items therein may then be edited by the user.

From step 808, the method returns to step 804 wherein the method continues to monitor whether the user has designated any condensed data section for detailed display.

Figure 7:
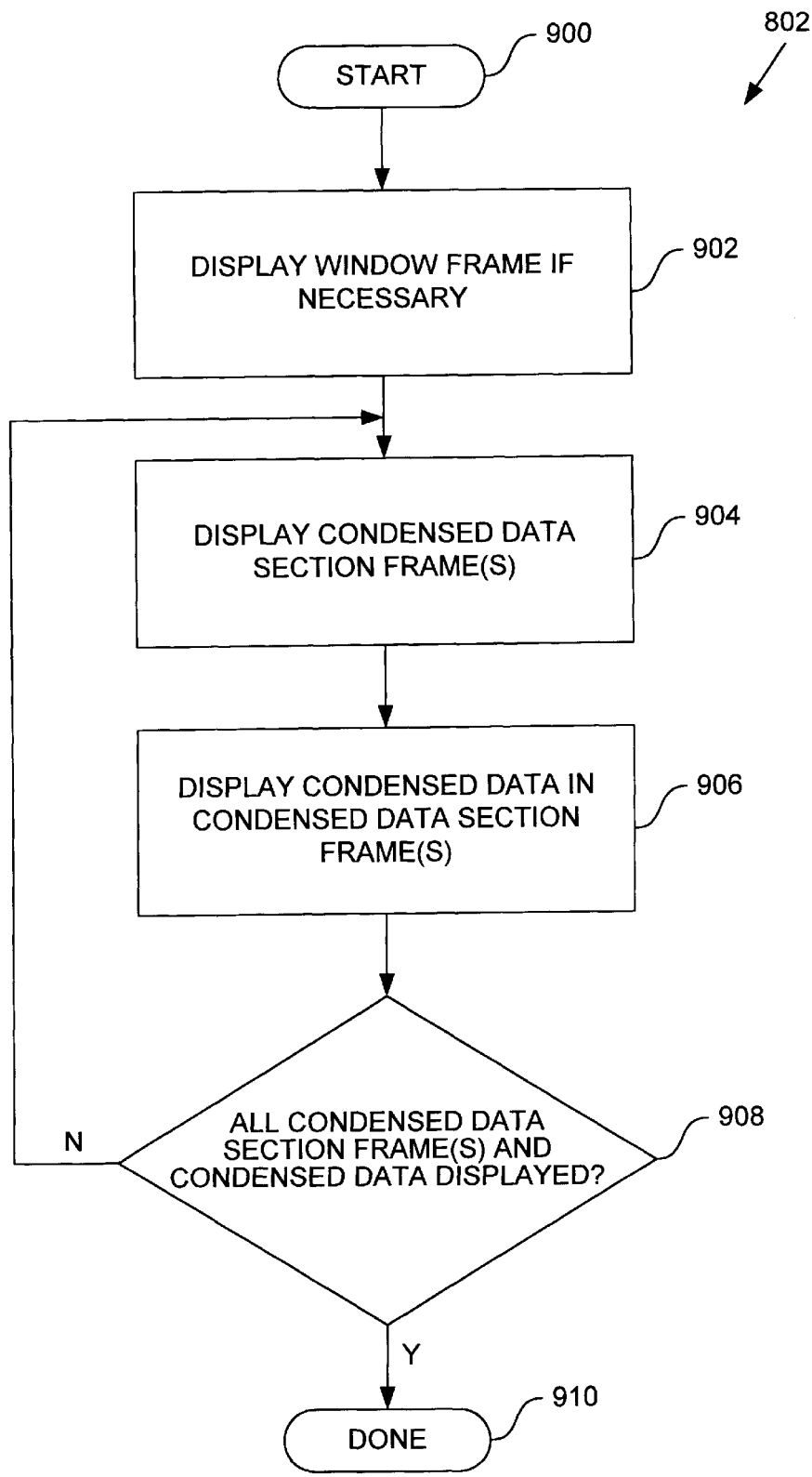
FIG. 7 is a flow chart illustrating, in accordance with one embodiment of the present invention, the steps involved in displaying preselected ones of the record's data items and data labels in the condensed display mode.

FIG. 7 is a flow chart illustrating, in accordance with one embodiment of the present invention, the steps involved in displaying preselected ones of the record's data items and data labels, i.e., the condensed data sets and associated condensed data labels, in the condensed display mode (step 802 of FIG. 6). FIG. 7 starts at step 900. In step 902, the window frame that is used for displaying the multiple condensed data sections, e.g., the frame of window 302 of FIG. 3, is displayed if needed. The window frame may need to be displayed in step 902 if this is the first time any record is displayed, e.g., upon launching the database program. If a window frame already exists, e.g., as in the case where other records have already been displayed in the same window frame, step 902 may not be necessary.

In step 904, the condensed data section frames are displayed. By way of example, the condensed data section frame of data section 338 of FIG. 3 may be displayed in step 904. A condensed data section frame visually separates one condensed data set and its associated condensed label set from other condensed data sets and their associated condensed label sets. When the condensed data section is manipulated, e.g., designated to display its data items in the detailed display mode, the manipulation preferably affects only the condensed data set and condensed label set that are associated with that condensed data section. Other condensed data sets and condensed label sets that may be displayed in the condensed display mode but not specifically associated with the manipulated condensed data section, i.e., displayed in other condensed data sections, are preferably left undisturbed. Note that step 904 is performed only if the condensed data are separated into groups in multiple condensed data sections. In the following steps, it is assumed that the condensed data is displayed in multiple condensed data sections. However, it should be understood that the condensed data may, if desired be displayed in a single data section in the display window.

In step 906, the condensed data sets and condensed label sets, i.e., those data items and labels that have been preselected to display in the condensed display mode, are displayed in the condensed data section frames. In one embodiment, all the condensed data section frames are displayed at once in step 904, and the condensed data section frames are then filled in with condensed data sets and condensed label sets in step 906. In another embodiment, the condensed data section frames are created and filled in with a condensed data set and associated condensed label set one at a time.

In step 908, the method ascertains whether all the condensed data sections and condensed data, i.e., condensed data sets and condensed label sets that have been preselected for display in the condensed display mode, have been displayed. If not, the method returns to step 904 to continue displaying the condensed data section frames and their associated condensed data. On the other hand, if it is ascertained in step 908 that all the condensed data section frames and condensed data have been displayed, the method proceeds to step 910 wherein the steps of FIG. 7 end.

Figure 8:
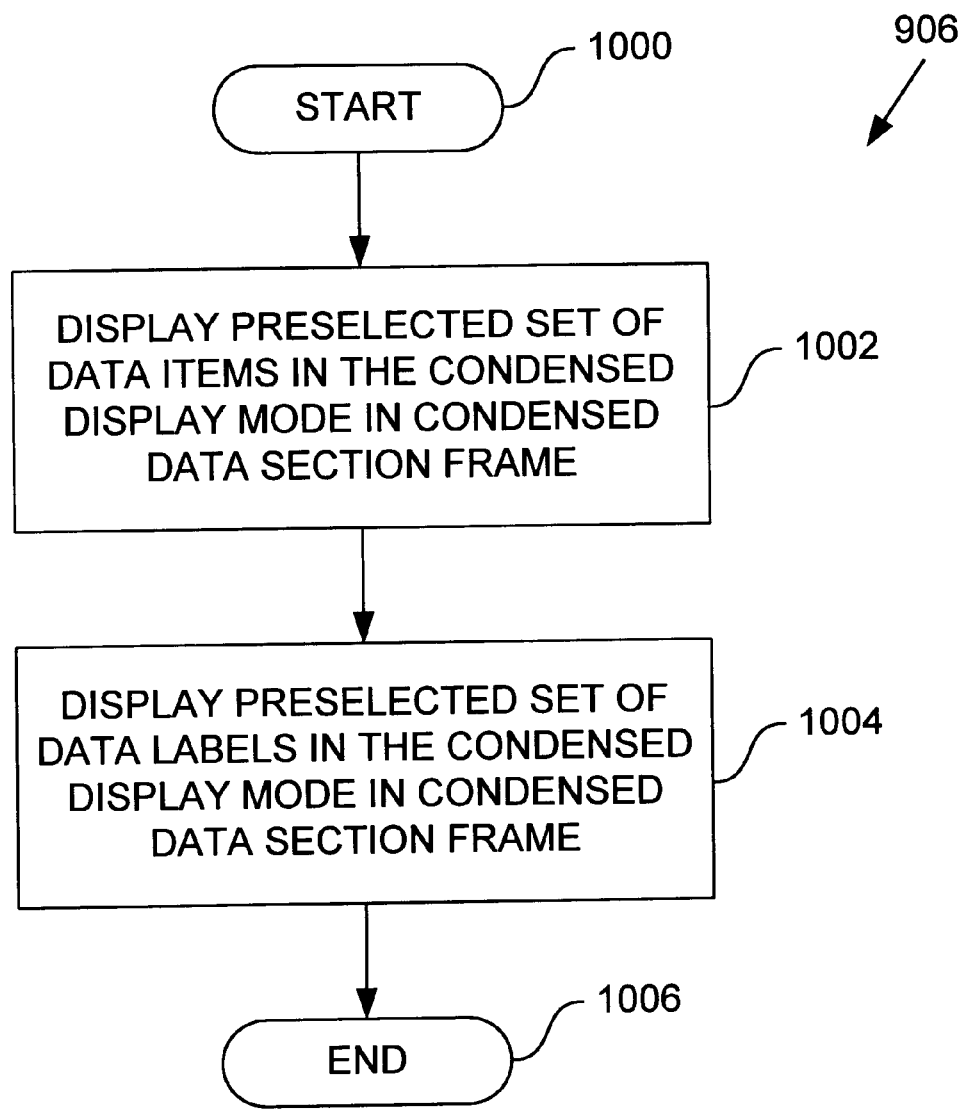
FIG. 8 illustrates, in accordance with one embodiment of the present invention, the steps for displaying a set of condensed data in a condensed data section frame.

FIG. 8 illustrates, in accordance with one embodiment of the present invention, the steps for displaying a condensed data set and associated condensed label set (if any), in a condensed data section frame. FIG. 8 starts at step 1000. In step 1002, a preselected set of data items of the database record is displayed in the condensed display mode inside the condensed data section frame. This preselected set of data items may represent all the data items associated with a data section, e.g., all data items related to the home address, or it may represent only a subset of all the data items related to a data section, e.g., only basic home address information. If this preselected set of data items represents only a subset of all the data items related to a data section, the full set of data items, along with their associated data labels and other controls/details, may be viewed upon entering the detailed display mode. Preferably, the number of data items in this preselected set, i.e., the condensed data set, is kept relatively low to avoid cluttering up the display window.

In step 1004, the preselected set of data labels for identifying the significance of the displayed condensed data sets are displayed in the condensed data frames. This preselected set of data labels may represent a subset of the set of data labels that are displayed in the detailed display mode. More preferably, this preselected set of data labels represents a subset of the set of data labels needed to identify every single data item in the condensed data sets. The display of a reduced number of data labels in the condensed display mode advantageously maximizes the available display space in the display window to permit more data items to be displayed simultaneously in the condensed display mode. In step 1006, the steps of FIG. 8 end.

Figure 9:
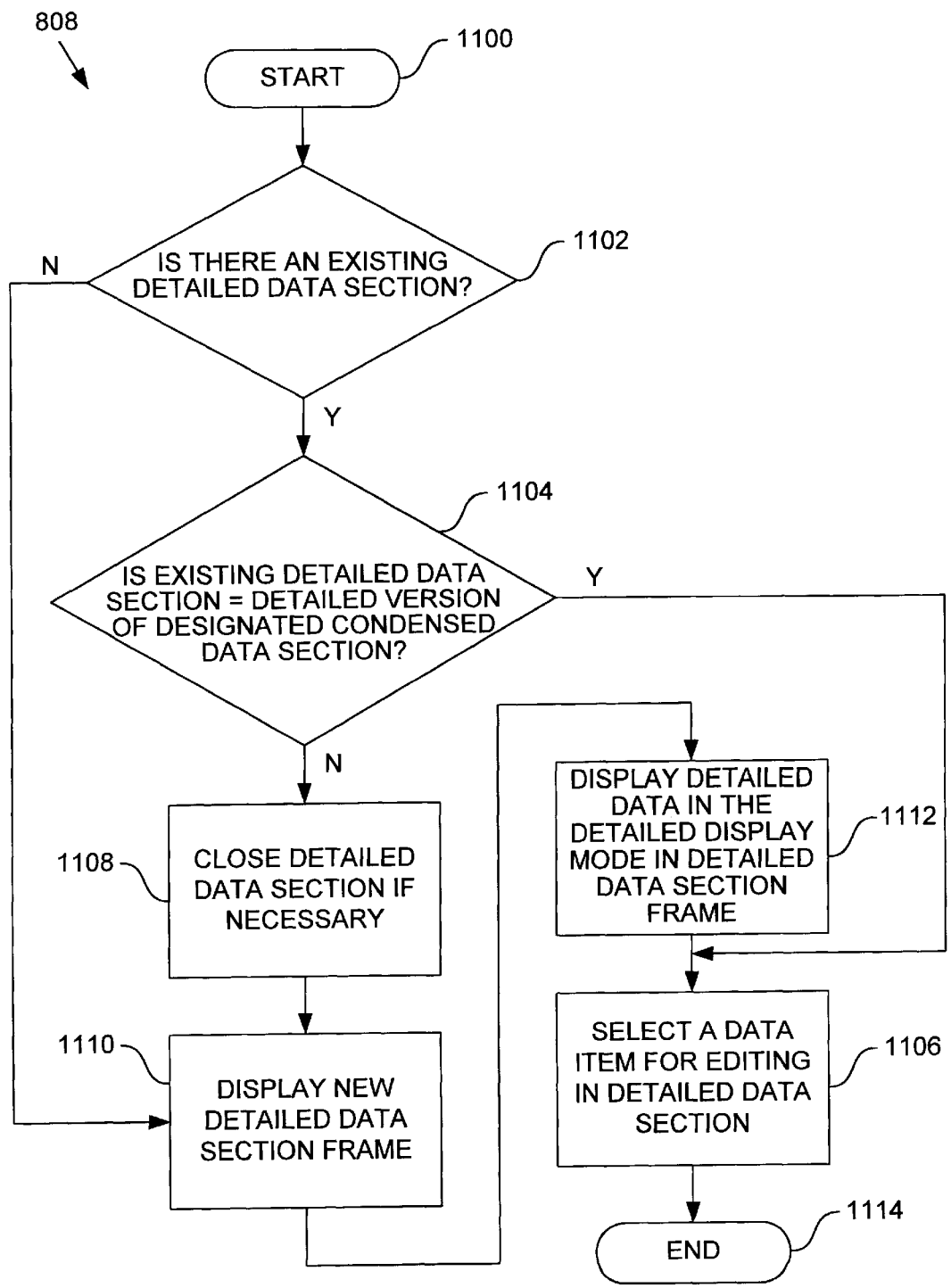
FIG. 9 is a flowchart illustrating, in one embodiment, the steps involved in displaying the record data items in the detailed display mode.

FIG. 9 is a flowchart illustrating, in one embodiment, the steps involved in displaying the record data items in the detailed display mode (e.g., step 808 of FIG. 6). In step 1102, the method determines whether there already exists a detailed data section in the display screen. If any detailed data section already exists, e.g., some of the record data items are already displayed in the detailed display mode, the method proceeds to step 1104.

In step 1104, the method determines whether the existing detailed data section represents the corresponding detailed version of the condensed data section being designated for display in the detailed display mode. By way of example, this situation may occur when the database program is already displaying the detailed data section that is of interest to the user, and the user designates the corresponding condensed data section for display in the detailed display mode. With reference to FIG. 5, this is the situation that occurs when the data items associated with condensed data section 338 are already displayed in the detailed display mode in a detailed display section (i.e., in detailed window 350), and the user designates condensed data section 338 again for display in the detailed display mode.

If the determination in step 1104 is positive (i.e., they are the same), the method proceeds to step 1106 wherein a data item is selected for editing in the detailed data section. By way of example, if the user designates a particular data item in the condensed data section for editing, e.g., by clicking on a particular data item in the condensed data section, that data item is then selected for editing when it is displayed, along with other data items, in the detailed display section. If the user designates the entire condensed data section for detailed display without designating any particular data item, e.g., by clicking within a condensed data section without clicking on any particular data item, the method preferably selects a default data item in the detailed data section for editing. The default data item selected for editing may represent, for example, the first data item of the detailed data section or the data item in the data field in which editing last took place (whether in this data record or in another data record).

On the other hand, if the determination in step 1104 is negative (i.e., they are not the same), the method proceeds to step 1108. In step 1108, the existing detailed data section is closed, if necessary, to make room for the display of the detailed data section that corresponds to the designated condensed data section.

From step 1108, the method proceeds to step 1110 wherein the new detailed data section frame is displayed. Note that the method also arrives at step 1110 from step 1102 if it is determined in step 1102 that no detailed data section exists in the display screen. In one embodiment, the newly displayed detailed data section frame may be positioned in an overlapping relationship, either partially or wholly, with the designated condensed data section (as illustrated in FIG. 4). In another embodiment, the newly displayed detailed data section frame may be scrolled into view in a detailed window (as illustrated in FIG. 5). Still in another embodiment, the newly displayed detailed data section frame may expand in place by pushing aside other existing condensed and detailed data sections. The newly displayed detailed data section frame may also be positioned at a predefined location in the display screen. There exist other conventional ways for positioning the newly displayed detailed data section frame, which may be suitably employed in step 1110.

In step 1112, the data items associated with the detailed data section, i.e., the detailed data set, are then displayed in the newly displayed detailed data section frame. As mentioned earlier, the data items displayed in the detailed data section frame preferably include at least some of the data items that are preselected to be omitted in the condensed display mode. Further, these data items are preferably displayed with their associated data labels and controls, i.e., the detailed label set, to maximize clarity. The data labels and/or controls displayed in the detailed display mode preferably include at least some of the data labels and/or controls that are preselected to be omitted in the condensed display mode. From step 1112, the method then proceeds to step 1106 wherein, as discussed earlier, a data item is selected for editing. The steps of FIG. 9 end at step 1114.

While this invention has been described in terms of several preferred embodiments, there are alterations, permutations, and equivalents which fall within the scope of this invention. For example, although the invention has been described mainly in reference to a PIM record for illustration ease and consistency, the inventive display technique may apply to a related data set that contains, for example, status data of a software-controlled process or apparatus and user-manipulable controls for altering aspects of the aforementioned software-controlled process or apparatus that are reflected by the status data. In this example, the condensed display mode may display, among others, the status data, along with a first set of data labels suitable for identifying the meaning of the displayed status data. The detailed display mode may display, among others, more detailed status data and/or the user-manipulable controls that are suitable for altering aspects of the aforementioned software-controlled process or apparatus that are reflected by the status data, along with a second set of data labels for identifying the controls. The user, by performing a predefined user interface action, may alternate between the display modes to either the view the status data or manipulate controls to alter the aforementioned software-controlled process or apparatus, thereby affecting changes to the status data.

As a further example, although the invention is described using flowcharts as an illustration aid, it should be noted that the methods and apparatus of the present invention may be event-driven, capable of executing multiple processes at the same time. As such, different processes and tasks do not necessarily have to be performed in the specific sequential order chosen for illustration, and a computer and/or software program implementing the inventive method may be executing other tasks while executing the inventive method disclosed herein.

Further, it should be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for displaying data items of a data record on a computer display screen of a computer, said method comprising:

displaying, in accordance with a condensed display mode, a condensed data set in a condensed data section on said computer display screen, said condensed data set representing a first set of data items of said record that has been preselected by a user of said computer to be displayed in said condensed data section in said condensed display mode; and upon receiving a predefined user command, displaying in accordance with a detailed display mode a detailed data set in a detailed data section on said computer display screen, said detailed data section representing a corresponding detailed version of said condensed data section, said detailed data set representing a second set of data items of said record that has been preselected to be displayed in said detailed data section in said detailed mode, wherein said second set of data items represents a corresponding detailed version of said first set of data items, wherein said condensed data set and said detailed data set are displayed simultaneously on said computer display screen; and displaying, in accordance with said condensed display mode, a condensed label set in said condensed data section on said computer display screen, said condensed label set representing a first set of data labels that has been preselected to be displayed in said condensed data section in said condensed display mode to identify data items in said condensed data set, wherein said condensed label set includes at least the partial use of no data labels to facilitate maximum display of information.

2. The method of claim 1 wherein said predefined user command represents a mouse click in said condensed data section.

3. The method of claim 1 wherein said first set of data items, when displayed in said condensed display mode, is uneditable by a user of said computer, and wherein said step of displaying said detailed data set in said detailed display mode comprises the step of rendering said second set of data items, when displayed in said detailed display mode, editable by a user of said computer.

4. The method of claim 1 further comprising the step of reverting, upon receiving a second predefined user command, to said condensed display mode to display said condensed data set in said condensed data section.

5. The method of claim 4 wherein said condensed data section corresponds to only one data section among multiple data sections on said computer display screen.

6. The method of claim 5 wherein said first predefined user command and said second predefined user command change a display mode of only one data section among said multiple data sections.

7. The method of claim 1 further comprising:
displaying, in accordance with said detailed display mode upon receiving said first predefined user command, a detailed label set in said detailed data section on said computer display screen, said detailed label set representing a second set of data labels that has been preselected to be displayed in said detailed data section in said detailed mode to identify data items in said detailed data set, wherein said detailed label set includes at least the partial use of no data labels to facilitate maximum display of information.

8. The method of claim 1 wherein said data record represents a data record of a personal information manager database.

9. The method of claim 1 wherein said condensed data set includes a first set of user-selectable data labels, said first set of user-selectable data labels representing a subset of a full set of data labels associated with said record.

10. The method of claim 1 wherein said condensed data section is displayed simultaneously with other data sections of said record in a window, said detailed data section, when selected by the user to be displayed in lieu of said condensed data section, causes other data sections of said record to be pushed aside in said window to make room for said detailed data section.

11. The method of claim 1 wherein said detailed data section is implemented in a scrolling window.

12. A method for displaying data items of a related data set in multiple data sections on a computer display screen of a computer, said method comprising:
displaying, in accordance with a condensed display mode, a first data set in a condensed data section on said computer display screen, said first data set representing a condensed data set of data items of said related data set that has been preselected by a user of said computer to be displayed in said condensed display mode; and
upon receiving a predefined user command, displaying in accordance with a detailed display mode a second data set in a detailed data section on said computer display screen, said second data set representing a detailed data set of said first data set and containing a second set of data items that has been preselected to be displayed in said detailed display modes, wherein said condensed data set and said detailed data set are displayed on said computer display screen; and
displaying, in accordance with said condensed display mode, a condensed label set in said condensed data section on said computer display screen, said condensed label set representing a first set of data labels that has been preselected to be displayed in said condensed data section in said condensed display mode to identify data items in said condensed data set, wherein said condensed label set includes at least the partial use of no data labels to facilitate maximum display of information.

13. The method of claim 12 wherein said related data set comprises a set of user-manipulable controls for controlling functions of a software program and status data related to aspects of said software program.

14. The method of claim 13 wherein said first set of data items represents said status data and said second set of data items represents said set of user-manipulable controls.

15. The method of claim 12 further comprising:
displaying, in accordance with said detailed display mode upon receiving said first predefined user command, a detailed label set in said detailed data section on said computer display screen, said detailed label set representing a second set of data labels that has been preselected to be displayed in said detailed data section in said detailed mode to identify data items in said detailed data set, wherein said condensed label set includes at least the partial use of no data labels to facilitate maximum display of information.

16. The method of claim 12 wherein said first predefined user command affects a display mode of only said first data set among said multiple data sections.

17. The method of claim 16 wherein said first data set and said second data set are alternately displayed in a non-simultaneous manner in a predefined position on said computer display screen.

18. The method of claim 17 wherein said predefined user command represents a mouse click in said condensed data section.

19. The method of claim 16 wherein said first data section and said second data section are simultaneously displayed in different locations on said computer display screen.

20. The method of claim 12 wherein said condensed data set includes a first set of user-selectable data labels, said first set of user-selectable data labels representing a subset of a full set of data labels associated with said record.

21. The method of claim 12 wherein said condensed data section is displayed simultaneously with other data sections of said record in a window, said detailed data section, when selected by the user to be displayed in lieu of said condensed data section, causes other data sections of said record to be pushed aside in said window to make room for said detailed data section.

22. The method of claim 12 wherein said detailed data section is implemented in a scrolling window.

23. The method of claim 16 wherein said first data set and said second data set are displayed simultaneously on said computer display screen.

24. A computer readable medium containing program instructions for displaying data items of a data record on a computer display screen of a computer, said program instructions comprise instructions for:
displaying, in accordance with a condensed display mode, a condensed data set in a condensed data section on said computer display screen, said condensed data set representing a first set of data items of said record that has been preselected by a user of said computer to be displayed in said condensed data section in said condensed display mode;
upon receiving a predefined user command, displaying in accordance with a detailed display mode a detailed data set in a detailed data section on said computer display screen, said detailed data section representing a corresponding detailed version of said condensed data section, said detailed data set representing a second set of data items of said record that has been preselected to be displayed in said detailed data section in said detailed mode, wherein said second set of data items represents a corresponding detailed version of said first set of data items, and wherein said condensed data set and said detailed data set are displayed simultaneously on said computer display screen; and displaying, in accordance with said condensed display mode, a condensed label set in said condensed data section on said computer display screen, said condensed label set representing a first set of data labels that has been preselected to be displayed in said condensed data section in said condensed display mode to identify data items in said condensed data set, wherein said condensed label set includes at least the partial use of no data labels to facilitate maximum display of information.

25. The computer readable medium of claim 24 wherein said data record represents a data record of a personal information manager database.

26. The method of claim 24 wherein said detailed data section is implemented in a scrolling window.

\* \* \* \* \*